(12) United States Patent
Li

(10) Patent No.: US 11,909,984 B2
(45) Date of Patent: Feb. 20, 2024

(54) VIDEO ENCODING AND DECODING FOR CLOUD GAMING

(71) Applicant: Tencent Technology (Shenzhen) Company Limited, Guangdong (CN)

(72) Inventor: Zhicheng Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/963,829

(22) Filed: Oct. 11, 2022

(65) Prior Publication Data
US 2023/0036405 A1 Feb. 2, 2023

Related U.S. Application Data

(63) Continuation of application No. PCT/CN2021/128969, filed on Nov. 5, 2021.

(30) Foreign Application Priority Data

Nov. 13, 2020 (CN) .......................... 202011269523.8

(51) Int. Cl.
*H04N 19/147* (2014.01)
*H04N 19/152* (2014.01)
*H04N 19/436* (2014.01)

(52) U.S. Cl.
CPC ......... *H04N 19/147* (2014.11); *H04N 19/152* (2014.11); *H04N 19/436* (2014.11)

(58) Field of Classification Search
CPC ..... A63F 13/00; H04L 67/131; H04N 19/147; H04N 19/152; H04N 19/436;
(Continued)

(56) References Cited

U.S. PATENT DOCUMENTS

| 2014/0056162 A1 | 2/2014 | Gopalan et al. |
| 2014/0082144 A1* | 3/2014 | Ramamurthy ... H04N 21/23439 709/219 |

(Continued)

FOREIGN PATENT DOCUMENTS

| CN | 101707551 A | 5/2010 |
| CN | 101867802 A | 10/2010 |

(Continued)

OTHER PUBLICATIONS

International Search Report and Written Opinion issued in International Application No. PCT/CN2021/128969, dated Jan. 26, 2022, with English Translation, 11 pages.

*Primary Examiner* — Mohammed S Rahaman

(74) *Attorney, Agent, or Firm* — ARENTFOX SCHIFF LLP

(57) ABSTRACT

A video encoding method of a cloud game is provided. Network bandwidth information of a video playback terminal is determined. Decoding computing power information of the video playback terminal is determined. At least one encoding parameter of a video of the cloud game is dynamically adjusted based on (i) the network bandwidth information and (ii) the decoding computing power information. The network bandwidth information and the decoding computing power information indicate a playback environment of the video of the cloud game. The video of the cloud game is encoded based on the at least one encoding parameter.

20 Claims, 8 Drawing Sheets

(58) Field of Classification Search
CPC ......... H04N 21/23439; H04N 21/2402; H04N 21/4424; H04N 21/4516
See application file for complete search history.

(56) References Cited

U.S. PATENT DOCUMENTS

| | | | |
|---|---|---|---|
| 2014/0317241 A1* | 10/2014 | Zhao | H04L 65/756 |
| | | | 709/219 |
| 2015/0146778 A1* | 5/2015 | De Cicco | H04N 19/115 |
| | | | 375/240.07 |
| 2018/0205778 A1* | 7/2018 | Forman | H04N 21/2402 |
| 2020/0195994 A1* | 6/2020 | Eluvan | H04N 21/23439 |
| 2021/0093960 A1* | 4/2021 | Cerny | A63F 13/53 |
| 2021/0146240 A1* | 5/2021 | Colenbrander | H04N 21/234381 |

FOREIGN PATENT DOCUMENTS

| | | |
|---|---|---|
| CN | 102521279 A | 6/2012 |
| CN | 104427402 A | 3/2015 |
| CN | 105376595 A | 3/2016 |
| CN | 112104879 A | 12/2020 |

\* cited by examiner

VIDEO ENCODING AND DECODING FOR CLOUD GAMING

RELATED APPLICATIONS

The present application is a continuation of International Application No. PCT/CN2021/128969 filed on Nov. 5, 2021, which claims priority to Chinese Patent Application No. 202011269523.8 filed on Nov. 13, 2020. The entire disclosures of the prior applications are hereby incorporated by reference in their entirety.

FIELD OF THE TECHNOLOGY

Embodiments of this application relate to video encoding technologies, including to a video encoding method and apparatus, a video decoding method and apparatus, an electronic device, a storage medium, and a computer program product.

BACKGROUND OF THE DISCLOSURE

Cloud technology is continuously being developed. For example, a quantity of cloud games deployed on a cloud server is increasing. However, encoding and transmission of the cloud games are not adaptively and dynamically adjusted according to a user network and a decoding capability of a terminal. As a result, an unstable user network or a user network with limited decoding computing power may cause cases of frequent frame freezing and slow response in a case that a cloud game is run.

SUMMARY

In view of the above, embodiments of this disclosure provide a video encoding method and apparatus, a video decoding method and apparatus, an electronic device, a storage medium, and a computer program product, so that network bandwidth information, decoding computing power information, and capacity configuration information of a playback buffer pool can be used to dynamically adjust a video playback encoding policy and determine a video encoding policy matching a playback environment of a target video, thereby reducing cases of frame freezing during video playback caused by a change of a network environment and an insufficient decoding capability of a terminal, and improving user experience.

Technical solutions in the embodiments of this disclosure include the following.

In an aspect, a video encoding method of a cloud game is provided. Network bandwidth information of a video playback terminal is determined. Decoding computing power information of the video playback terminal is determined. At least one encoding parameter of a video of the cloud game is dynamically adjusted based on (i) the network bandwidth information and (ii) the decoding computing power information. The network bandwidth information and the decoding computing power information indicate a playback environment of the video of the cloud game. The video of the cloud game is encoded based on the at least one encoding parameter.

In an aspect, a video decoding method, performed by an electronic device, is provided. The video decoding method may be applied to an encoded target video through the foregoing video encoding method. The encoded target video is obtained. The encoded target video is decoded with a video decoding policy corresponding to a video encoding policy.

In an aspect, a video encoding apparatus is provided. The video encoding apparatus includes processing circuitry configured to determine network bandwidth information of a video playback terminal, and determine decoding computing power information of the video playback terminal. The processing circuitry is configured to dynamically adjust at least one encoding parameter of a video of the cloud game based on (i) the network bandwidth information and (ii) the decoding computing power information, the network bandwidth information and the decoding computing power information indicating a playback environment of the video of the cloud game. The processing circuitry is configured to encode the video of the cloud game based on the at least one encoding parameter.

An aspect further provides a video decoding apparatus, applied to an encoded target video through the foregoing video encoding method, and including an obtaining module and an information decoding module. The obtaining module is configured to obtain the encoded target video. The information decoding module is configured to decode the encoded target video with a video decoding policy corresponding to a video encoding policy.

An aspect further provides an electronic device, including a memory and a processor. The memory is configured to store executable instructions. The processor is configured to implement, when executing the executable instructions stored in the memory, the foregoing video encoding method or the foregoing video decoding method.

An embodiment of this disclosure further provides a non-transitory computer-readable storage medium, storing instructions which when executed by a processor cause the processor to implement the foregoing video encoding method or the foregoing video decoding method.

An embodiment of this disclosure provides a computer program product, including a computer program or an instruction, the computer program or the instruction, when executed by a processor, implementing the foregoing video encoding method or the foregoing video decoding method.

Embodiments of this disclosure may include the following beneficial effects:

The network bandwidth information, the decoding computing power information, or the capacity configuration information of the playback buffer pool is used to dynamically adjust the video playback encoding policy and determine the video encoding policy matching the playback environment of the target video, thereby reducing the cases of frame freezing during video playback caused by the change of the network environment and the insufficient decoding capability of the terminal, thereby improving the user experience.

DESCRIPTION OF EMBODIMENTS

Figure 1:
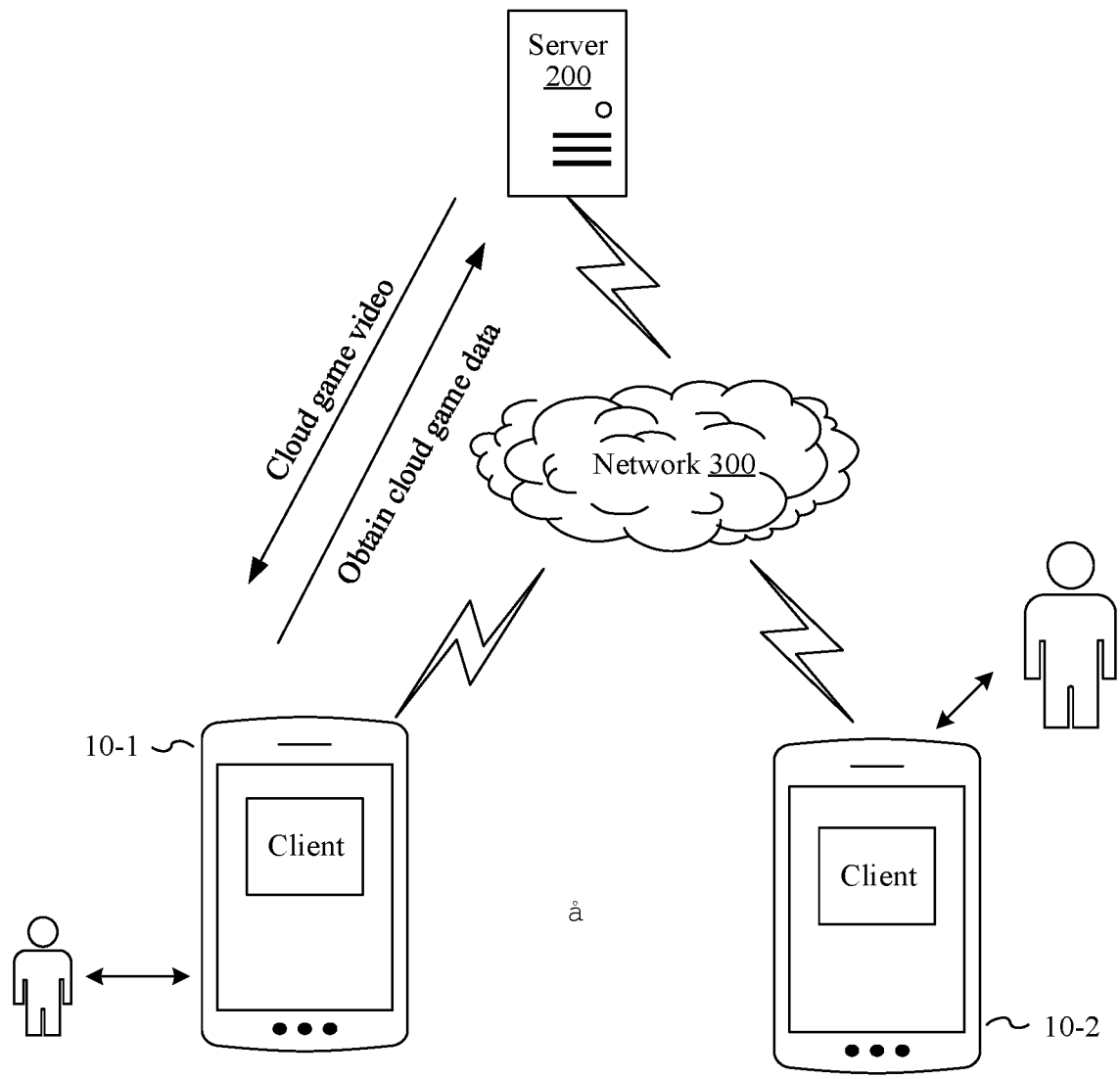
FIG. 1 is a schematic diagram of a use environment of a video encoding method and a video decoding method according to an embodiment of this disclosure.

To make the objectives, technical solutions, and advantages of this disclosure clearer, the following describes this disclosure in further detail with reference to the accompanying drawings. The described embodiments are not to be considered as a limitation to this disclosure. Other embodiments are within the scope of this disclosure.

In the following descriptions, the term "some embodiments" describes subsets of all possible embodiments, but it may be understood that "some embodiments" may be the same subset or different subsets of all the possible embodiments, and can be combined with each other without conflict.

Before the embodiments of this disclosure are further described in detail, a description is made on nouns and terms involved in the embodiments of this disclosure, and the nouns and terms involved in the embodiments of this disclosure are applicable to the following explanations.

Video transcoding may refer to conversion of a compressed and encoded video bitstream into another video bitstream, to adapt to different network bandwidths, different terminal processing capabilities, and different user requirements.

A client may refer to a carrier that implements a specific function in a terminal, for example, a mobile client (APP) is a carrier of a specific function in a mobile terminal, to implement, for example, a function of online live streaming (video streaming) or a function of playing an online video.

The expression "in response to" may be used for indicating a condition or a status on which a to-be-performed operation depends. In a case that the condition or the status is satisfied, one or more to-be-performed operations may be real-time or have a set delay. Unless otherwise specified, there is no chronological order between the plurality of to-be-performed operations.

A virtual environment may include a virtual environment displayed (or provided) in a case that an application is run on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment. A description is made by using an example in which the virtual environment is a three-dimensional virtual environment in the following embodiments, but this is not limited. For example, the virtual environment is further used for a virtual environment battle between at least two virtual objects. The virtual environment is further used for a battle performed between at least two virtual objects by using virtual guns. The virtual environment is further used for a battle performed between at least two virtual objects by using virtual guns in a range of a target region, and the range of the target region may be continuously decreased as time goes by in the virtual environment.

Cloud technology may include a hosting technology that unifies a series of resources such as hardware, software, and networks in a wide area network or a local area network to implement computing, storage, processing, and sharing of data. Cloud technology may be a collective name of a network technology, an information technology, an integration technology, a management platform technology, an application technology, and the like based on an application of a cloud computing business mode, and may form a resource pool. Usage is based on a requirement and is flexible and convenient. A cloud computing technology becomes an important support. A background service of a technical network system requires a large amount of computing and storage resources, such as a video website, an image website, and more portal websites. As the Internet industry is highly developed and applied, each article may have its own identifier in the future and needs to be transmitted to a background system for logical processing. Data at different levels is separately processed, and data in various industries requires strong system support and this can only be implemented through cloud computing.

A cloud game may refer to a game that runs in a cloud server device. In a cloud game, after a game picture rendered by a cloud device is encoded, the game picture is transmitted to a user terminal through a network, and then the user terminal renders the encoded file to a display screen for display after decoding the encoded file. Therefore, a user does not need to install the game locally, but only need to establish a communication network connection with a cloud side, to implement a game interaction process.

Frames per second (FPS) may refer to a definition in the field of images, and refer to frames of pictures transmitted per second, that is, a quantity of pictures of an animation or a video. FPS measures an amount of information used for saving and displaying a dynamic video. As frames per second increases, a displayed action is smoother. 30 FPS is a lowest requirement for avoiding an unsmooth action in certain embodiments.

FIG. 1 is a schematic diagram of a use scenario of a video encoding method and a video decoding method according to an embodiment of this disclosure. The following describes a use environment of the video encoding method and the video decoding method provided in this embodiment of this disclosure.

Each of terminals (including a terminal 10-1 and a terminal 10-2) is provided with a client (e.g., a client for a cloud game) running video playback, and a user may obtain game content stored in a cloud server through a disposed cloud game software client. The terminal may be connected to a server 200 (e.g., the cloud server) through a network 300, and the network 300 may be a wide area network, a local area network, or a combination of the wide area network and the local area network, and achieves data transmission by using a radio link. The video encoding method provided in this embodiment of this disclosure may serve the terminal in a form of a cloud service (encapsulated in a professional game terminal or encapsulated in different mobile electronic devices), which is not specifically limited in this embodiment of this disclosure. The game is run in the cloud server, and after a game picture rendered by the cloud server is encoded, an encoded file is obtained and transmitted to the terminal through the network 300. The terminal decodes and then renders the encoded file, to display the game in the display interface. Therefore, a user does not need to install the game locally, but only needs to establish a communication network connection with a cloud side, to implement a game interaction process.

It should be noted that a video in this embodiment of this disclosure is not limited to a game video, but may alternatively be a short video, a live streaming video, or the like. The foregoing terminal may include various types of applications, such as an instant messaging application, a video playback application, a short video application, a live streaming application.

In some embodiments, the foregoing video encoding method and the video decoding method may further be, but are not limited to be, applied to scenarios such as a cloud game, a video call, and live video streaming.

It should be noted that an organization architecture of a cloud game includes a terminal and a cloud server. The terminal is configured to receive a control operation of a user for a game process and send a control instruction corresponding to the control operation to the cloud server. The cloud server is configured to control a game process and send a video stream in the game process to the terminal for playback. That is, in the organization architecture of the cloud game, the terminal is mainly configured to: receive, in the game process, a game video and game audio that are sent by the cloud server; render and play the game video and game audio; and send an operation (which includes but is not limited to an operation performed by a game user in a manner such as a mouse, a keyboard, an operating handle, a voice instruction, and a touch instruction) performed by the game user on a terminal side to the cloud server through a signaling channel that is connected to the cloud server. The cloud server sends the operation information to a matched mouse driving process, a sound card driving process, and a keyboard driving process, to control the cloud game. Specifically, processing content of the cloud server may include: (1) performing, during running of the cloud game, computing and game rendering, collecting and encoding a picture, collecting and encoding sound from a sound card, and sending video information and audio information on which encoding processing is performed to the terminal in a form of streaming media; and (2) receiving an operation instruction from the terminal, and sending the operation instruction to a corresponding mouse driving process, sound card driving process, and keyboard driving process, to control the cloud game.

Figure 2:
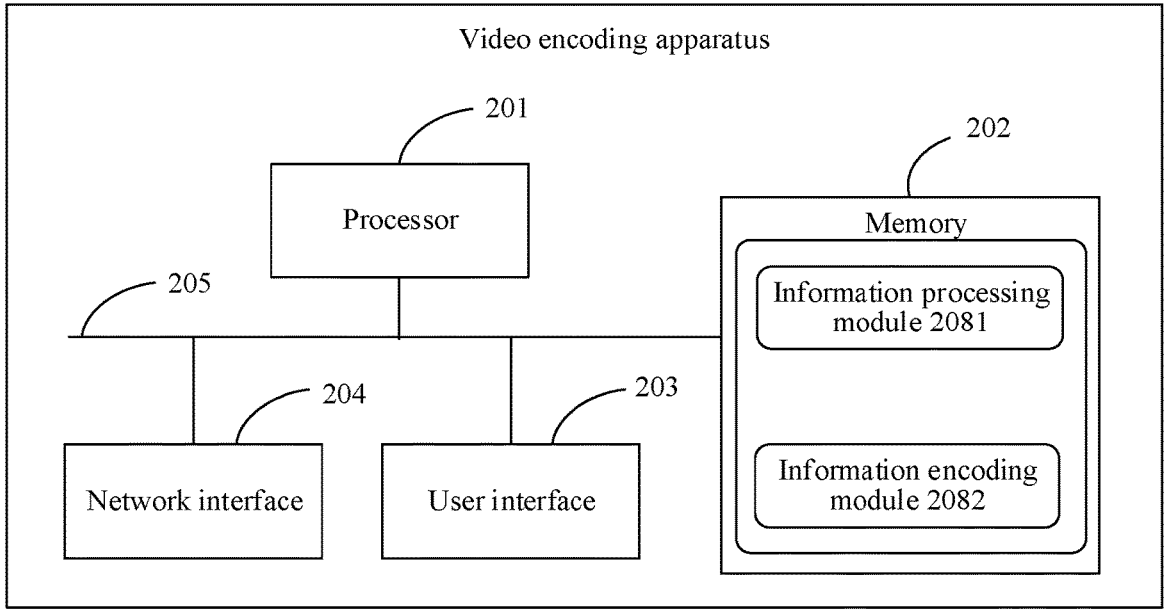
FIG. 2 is a schematic structural diagram of composition of a video encoding apparatus according to an embodiment of this disclosure.

A structure of a video encoding apparatus according to an embodiment of this disclosure is described below in further detail. The video encoding apparatus may be implemented in various forms, for example, a dedicated terminal with a video encoding apparatus processing function, or an electronic device (e.g., a mobile phone, or a tablet computer) provided with the video encoding apparatus processing function, for example, the terminal 10-1 or the terminal 10-2 in FIG. 1. FIG. 2 is a schematic structural diagram of composition of a video encoding apparatus according to an embodiment of this disclosure. It may be understood that,
FIG. 2 shows only an exemplary structure rather than a complete structure of the video encoding apparatus. The structure shown in FIG. 2 may be partially or entirely implemented based on requirements.

The video encoding apparatus provided in this embodiment of this disclosure includes: at least one processor 201, a memory 202, a user interface 203, and at least one network interface 204. The components in the video encoding apparatus may be coupled together through a bus system 205. It may be understood that the bus system 205 is configured to implement connection and communication between the components. In addition to a data bus, the bus system 205 further includes a power bus, a control bus, and a state signal bus. However, for ease of clear description, all types of buses are labeled as the bus system 205 in FIG. 2.

The user interface 203 may include a display, a keyboard, a mouse, a track ball, a click wheel, a key, a button, a touch panel, a touchscreen, or the like.

It may be understood that, the memory 202 may be a volatile memory or a non-volatile memory, or may include both a volatile memory and a non-volatile memory. The memory 202 in this embodiment of this disclosure can store data to support typical operation of the terminal (e.g., the terminal 10-1). An example of the data includes any computer program to be operated on the terminal (e.g., the terminal 10-1), for example, an operating system and an application program. The operating system includes various system programs, such as framework layers, kernel library layers, and driver layers used for implementing various basic services and processing hardware-based tasks. The application program may include various application programs.

In some embodiments, the video encoding apparatus provided in this embodiment of this disclosure may be implemented in the form of a combination of software and hardware. In an example, the video encoding apparatus provided in this embodiment of this disclosure may include processing circuitry, such as a processor in the form of a hardware decoding processor, and is programmed to perform the video encoding method provided in the embodiments of this disclosure. For example, the processor in the form of a hardware decoding processor may use one or more application specific integrated circuits (ASICs), DSPs, programmable logic devices (PLDs), complex programmable logic devices (CPLDs), field-programmable gate arrays (FP-GAs), or other electronic elements.

For example, the video encoding apparatus provided in this embodiment of this disclosure is implemented by a combination of software and hardware. The video encoding apparatus provided in this embodiment of this disclosure may be directly embodied as a combination of software modules executed by the processor 201. The software module may be located in a computer-readable storage medium, the computer-readable storage medium is located in the memory 202, and the processor 201 reads executable instructions included in the software module in the memory 202, and implements, in combination with necessary hardware (for example, including the processor 201 and another component connected to the bus 205), the video encoding method provided in the embodiment of this disclosure.

For example, the processor 201 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

In an example in which the video encoding apparatus provided in this embodiment of this disclosure is implemented by hardware, the apparatus provided in this embodiment of this disclosure may be directly executed by using the processor 201 in the form of a hardware decoding processor, for example, one or more application specific integrated circuits (ASICs), DSPs, programmable logic devices (PLDs), complex programmable logic devices (CPLDs), field-programmable gate arrays (FPGAs), or other electronic elements, to perform the video encoding method provided in the embodiment of this disclosure.

The memory 202 in the embodiments of this disclosure is configured to store various types of data to support operation of the video encoding apparatus. An example of the data includes: any executable instruction to be operated on the video encoding apparatus, for example, an executable instruction. A program that implements the video encoding method of the embodiments of this disclosure may be included in the executable instruction.

In other embodiments, the video encoding apparatus provided in this embodiment of this disclosure may be implemented in the form of software. FIG. 2 shows the video encoding apparatus that is stored in the memory 202, which may be software in the form of a program, a plug-in, or the like, and include a series of modules. An example of the program stored in the memory 202 may include the video encoding apparatus. The video encoding apparatus includes the following software modules: an information processing module 2081 and an information encoding module 2082. In a case that the software modules in the video encoding apparatus are read by the processor 201 into a RAM for execution, the video encoding method provided in the embodiment of this disclosure is implemented. One or more modules, submodules, and/or units of the apparatus can be implemented by processing circuitry, software, or a combination thereof, for example.

The information processing module 2081 is configured to determine network bandwidth information based on a network bandwidth environment of a video playback terminal, and further configured to: determine decoding computing power information of the video playback terminal, obtain capacity configuration information of a playback buffer pool in a video playback environment, and dynamically adjust a video playback encoding policy based on at least one of the network bandwidth information, the decoding computing power information, or the capacity configuration information of the playback buffer pool, to obtain a video encoding policy matching a playback environment of a target video. The at least one of the network bandwidth information, the decoding computing power information, or the capacity configuration information of the playback buffer pool may include any one or a combination of the network bandwidth information, the decoding computing power information, or the capacity configuration information of the playback buffer pool. The information encoding module 2082 is configured to encode the target video through the video encoding policy.

A structure of a video decoding apparatus according to an embodiment of this disclosure is briefly described below The video decoding apparatus may be implemented in various forms, for example, a dedicated terminal with a video decoding apparatus processing function, or an electronic device (e.g., a mobile phone, or a tablet computer) provided with the video decoding apparatus processing function, for example, the terminal 10-1 or the terminal 10-2 in FIG. 1. Functions of software modules in the video decoding apparatus include an obtaining module and an information decoding module. One or more modules, submodules, and/or units of the apparatus can be implemented by processing circuitry, software, or a combination thereof, for example.

The obtaining module is configured to obtain the encoded target video. The information decoding module is configured to decode the encoded target video through a video decoding policy corresponding to a video encoding policy.

According to the electronic device shown in FIG. 2, an embodiment of this disclosure further provides a computer program product or a computer program. The computer program product or the computer program includes computer instructions, and the computer instructions are stored in a computer-readable storage medium, such as a non-transitory computer-readable storage medium. A processor of a computer device reads the computer instructions from the computer-readable storage medium, and executes the computer instructions, so that the computer device performs different embodiments and a combination of the embodiments provided in various implementations of the foregoing video encoding method and video decoding method.

Figure 3:
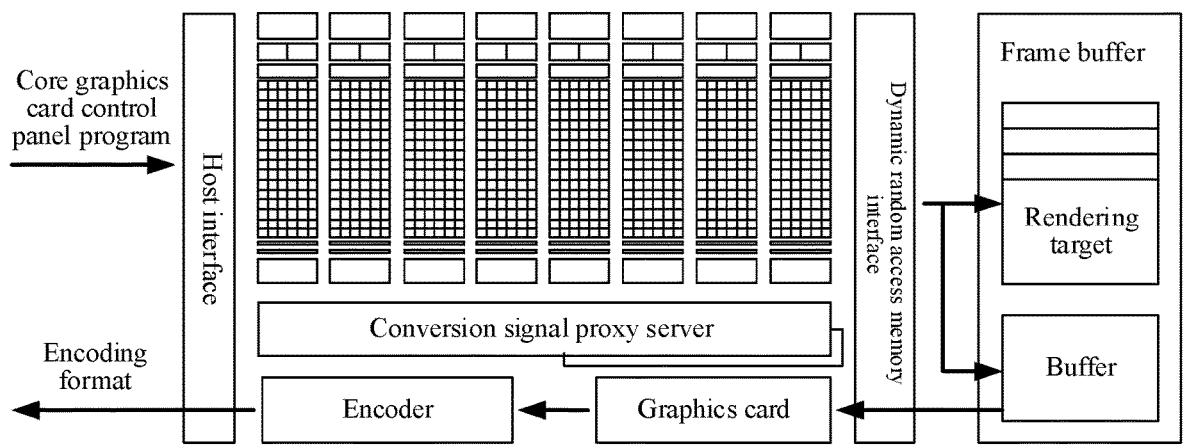
FIG. 3 is a schematic diagram of a processing method for video encoding and display according to an embodiment of this disclosure.

FIG. 3 is a schematic diagram of a processing method for video encoding and display according to an embodiment of this disclosure. During video encoding, through a desktop collection and encoding solution in a cloud game, a game picture may be collected, and then transmitted to the terminal after being encoded. A desktop collection frame rate is synchronous with a game frame rate. Using an example in which a graphics processing unit (GPU) renders 3D graphics, the method may include the several aspects described below.

(1) In an example of vertex processing, the GPU reads vertex data describing an appearance of a 3D graphic, and determines a shape and a position relationship of the 3D graphic according to the vertex data, to establish a skeleton of the 3D graphic. An example in which the method is applied to different game environments including but not limited to a virtual reality application, a three-dimensional map program, a military simulation program, a first-person shooting game (FPS), and a multiplayer online battle arena game (MOBA) is used, and the skeleton of the 3D graphic in a three-dimensional virtual environment is finally presented on a user interface (UI). The vertex data describing the appearance of the 3D graphic may be implemented through texture coordinates of vertexes in a texture coordinate set. Specifically, corresponding texture coordinate line segments may be formed between the texture coordinates of the vertexes. In a case that shortest paths between all texture coordinate vertexes pass through a certain node, it is considered that the node is a root node (betweenness centrality) of the skeleton. Therefore, the skeleton of the 3D graphic may be established.

In an example of rasterization computing, the vertex data is converted into a fragment, and an image actually displayed by a display screen includes a pixel group. A process in which the vertex data formed in a vertex processing stage is converted into corresponding pixels through a conversion algorithm, to achieve conversion of a vector graph into a series of pixels may be referred to as rasterization. For example, through the rasterization computing, the vertex data of the skeleton of the 3D graphic that is represented based on an oblique line segment is converted into consecutive pixels in a stepped shape.

In an example of texture mapping, in a generation stage of the vertex data of the skeleton of the 3D graphic, only a polygon that only forms a contour of a 3D object is generated, while mapping on a surface of the polygon is implemented through texture mapping, that is, a corresponding picture is mapped onto the surface of the polygon, so that a "realistic" graph is generated.

in an example of pixel processing, in a rasterization computing execution stage and in a process of converting each pixel, the GPU implements computing and processing for pixels, to determine a final attribute of each pixel.

In an example of a final output, the pixels are outputted through a rasterization engine, and after one frame of image is rendered, the rendered image is sent to a frame buffer of a video memory.

However, the encoding and transmission process shown in FIG. 3 is not adaptively and dynamically adjusted according to a user network and a decoding capability of the terminal. As a result, for some user networks that are unstable or have limited decoding computing power, problems such as frequent frame freezing and slow response are caused during playing of a cloud game. For example, in the related art, only latest frame data is read from the frame buffer regularly, and then sent to a encoder for encoding. The encoded and compressed frame data is subsequently transmitted to the terminal of the cloud game, and displayed on a display interface of the terminal of the cloud game. However, in a case that a user with limited decoding computing power plays the cloud game, due to an insufficient decoding capability of hardware, a load of the terminal is relatively high, and the decoding capability cannot keep up with a cloud frame rate picture, resulting in the problems of frequent frame freezing and slow response. For a cloud game with a relatively high frame rate, resolution, and bit rate, a hardware load of the terminal is relatively high in a case that the decoding is performed and a picture is rendered at a high frame rate, which may cause overheating of a battery of the terminal and frequent forced frequency reduction, thereby affecting the user experience.

Figure 4:
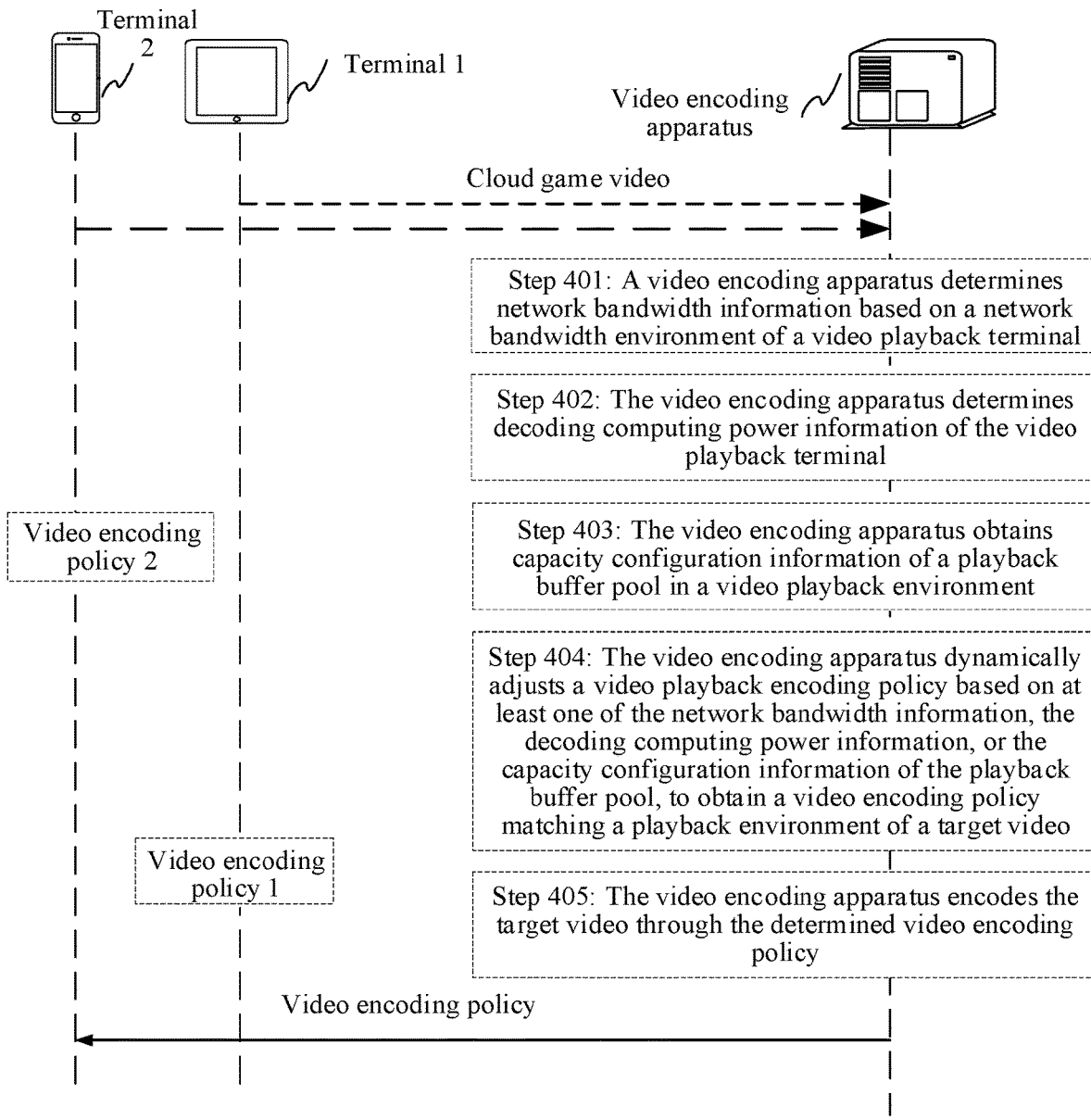
FIG. 4 is a schematic flowchart of a video encoding method according to an embodiment of this disclosure.

To overcome the foregoing problems, the video encoding method provided in the embodiments of this disclosure is described with reference to the electronic device shown in FIG. 2. FIG. 4 is a schematic flowchart of a video encoding method according to an embodiment of this disclosure. It may be understood that, steps shown in FIG. 4 may be performed by various electronic devices running the video encoding apparatus, for example, a dedicated terminal, a server, or a server cluster with a video encoding function. The following describes the steps shown in FIG. 4.

In step 401, a video encoding apparatus determines network bandwidth information based on a network bandwidth environment of a video playback terminal. In an example, network bandwidth information of a video playback terminal is determined.

In step 402, the video encoding apparatus determines decoding computing power information of the video playback terminal. In an example, decoding computing power information of the video playback terminal is determined.

The decoding computing power information may be used to represent a quantity of frames on which video decoding processing can be performed by the video playback terminal (e.g., a terminal 1 and a terminal 2 in FIG. 4) per unit time. The larger the amount of decoding computing power, the more the quantity of frames on which the video decoding processing can be performed by the video playback terminal per unit time.

In some embodiments, the decoding computing power information of the video playback terminal may be determined in the following manner: obtaining hardware type information of the video playback terminal; determining configuration information of the video playback terminal based on the hardware type information of the video playback terminal; and determining the decoding computing power information of the video playback terminal based on the configuration information of the video playback terminal.

For example, during running of a cloud game, that is, during playback of a cloud game video, the decoding computing power information of the video playback terminal is first determined, that is, a use environment in which the terminal has relatively low decoding computing power and unstable computing power is determined. For example, the decoding computing power of the video playback terminal may be determined according to the configuration information of the video playback terminal. In a case that a decode delay for decoding a frame of video frame is greater than or equal to a parameter A, it is indicated that the video playback terminal has relatively low decoding computing power. The decode delay is used for representing a time consumed by the video playback terminal to decode a frame of video frame. For example, the parameter A is defined as 1000/picture frame rate*0.8, and therefore, the video encoding policy may be triggered to be adjusted, thereby reducing frame freezing of the cloud game video, and improving the user experience.

For example, since different video playback terminals have different decoding capabilities, it is necessary to determine the decoding computing power information of the video playback terminals. For a video playback terminal whose hardware type information is already obtained, configuration information of the video playback terminal may be determined through the corresponding hardware type information. For example, for a mobile phone of an XX model of an XX brand, it may be determined, through the hardware type information (or a network access code of the mobile phone of the XX model), that the configuration information of the video playback terminal is as follows: a model A central processing unit (CPU), a model B GPU, and a model C main board. Decoding capability information corresponding to the video playback terminal may be determined through the determined configuration information of the video playback terminal, and a CPU or GPU of a high-specification model shown in the configuration information of the video playback terminal can improve the decoding capability corresponding to the video playback terminal. Since a user of a cloud game can flexibly switch between different video playback terminals according to different operating environments, by determining the decoding computing power information of the video playback terminal through the configuration information of the video playback terminal, a situation of the terminal of the game user can be obtained at a given time and accurately, which facilitates timely adjustment of the video encoding policy to adapt to different use environments.

In some embodiments, the decoding computing power information of the video playback terminal may be determined in the following manner: obtaining real-time load information of the video playback terminal; and determining the decoding computing power information of the video playback terminal based on the real-time load information of the video playback terminal.

For example, since the decoding capability of the same video playback terminal is further limited by a quantity of carried decoding tasks, a change in the real-time load information of the video playback terminal may cause a change in a real-time decoding capability of the video playback terminal. For example, for the mobile phone with the configuration information of the model A CPU, model B GPU, and model C main board, in a case that a quantity of carried decoding service processes is 1 (load information), the real-time decoding capability is 10 frames/second. In a case that the configuration information and a network status remain unchanged, the video playback terminal bears a task of decoding for both a local game and video playback, the quantity of the decoding service processes carried by the video playback terminal is 3, and the real-time decoding capability is 3 frames/second, showing a significant decline. Therefore, the video encoding policy needs to be adjusted in time, to adapt to a change of the video encoding use environment, thereby providing better user experience for the user.

In step 403, the video encoding apparatus obtains capacity configuration information of a playback buffer pool in a video playback environment. In an example, buffer information of a playback buffer of the video of the cloud game to be played back by the video playback terminal is obtained.

Figure 5:
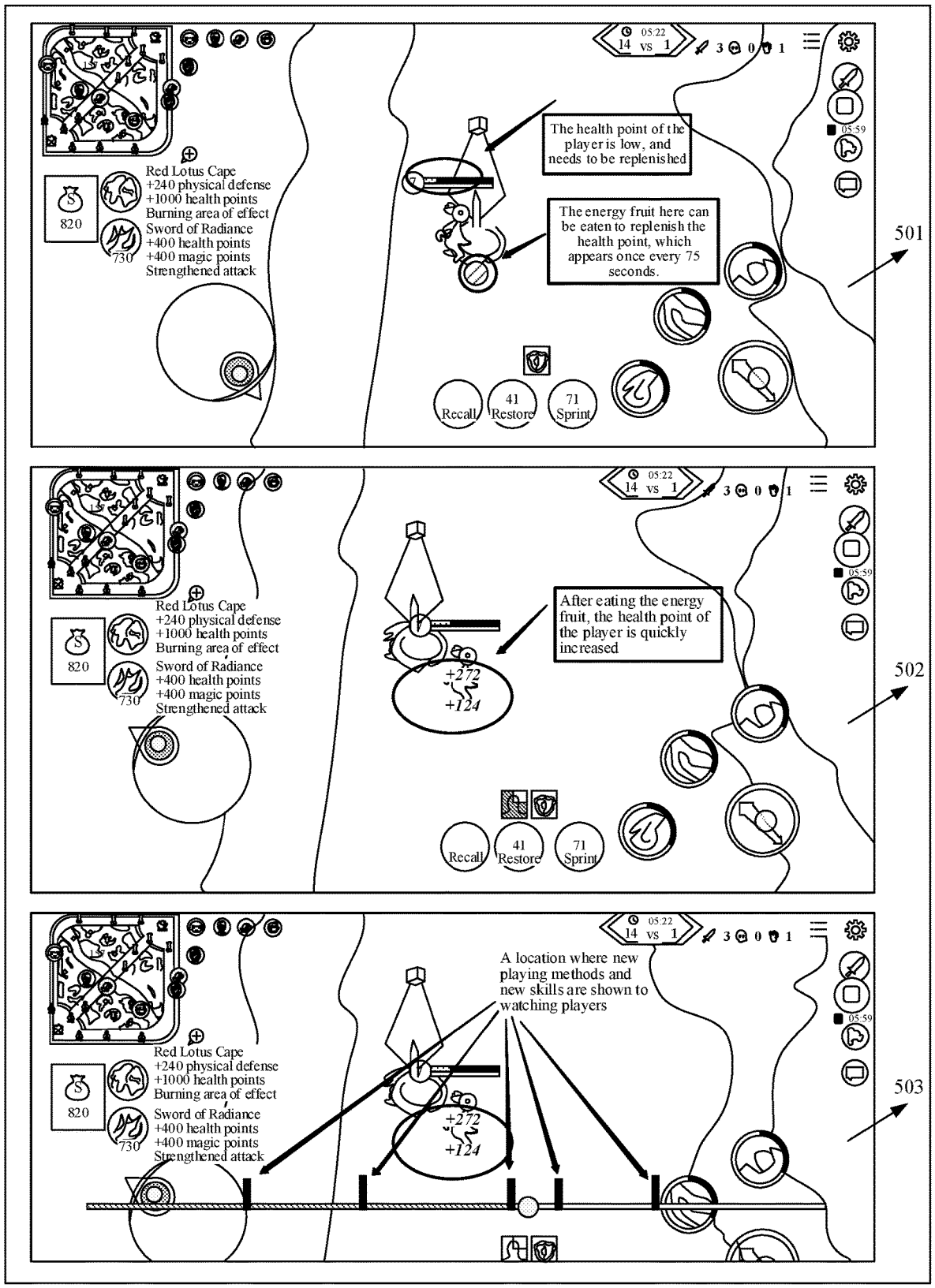
FIG. 5 is a schematic diagram of a use environment of a video encoding method according to an embodiment of this disclosure.

FIG. 5 is a schematic diagram of a use environment of a video encoding method according to an embodiment of this disclosure. The capacity configuration information of the playback buffer pool in the video playback environment may be obtained in the following manner: obtaining a length of a real-time data frame queue of the playback buffer pool; and determining the capacity configuration information of the playback buffer pool in the video playback environment based on a comparison result of the length of the real-time data frame queue length the playback buffer pool to a length threshold.

Using a cloud game as an example, as shown in FIG. 5, in a case that a cloud game video is played, the video playback terminal receives a video frame encoded by the server, and then decodes and plays the video frame. After receiving the video frame of the game video encoded by the server or a data frame carrying video information, the video playback terminal needs to store the received video frame of the game video or the data frame carrying the video information in the playback buffer pool of the video playback terminal, and a decoding apparatus of the video playback terminal decodes the video frame of the game video in the real-time data frame queue of the playback buffer pool or the data frame carrying the video information. Through decoding, a video frame 501 of number 1, a video frame 502 of number 2, and a video frame 503 of number 3 of the game video may be displayed, so that the game user obtains three complete video frames of the game video. In this process, the stronger the decoding computing power of the video playback terminal, the fewer the quantity of frames in the real-time data frame queue of the playback buffer pool. In a use scenario of the cloud game, the quantity of frames in the real-time data frame queue of the playback buffer pool may be maintained at 0, thereby ensuring that a game video without frame freezing is obtained during running of the cloud game.

Figure 6:
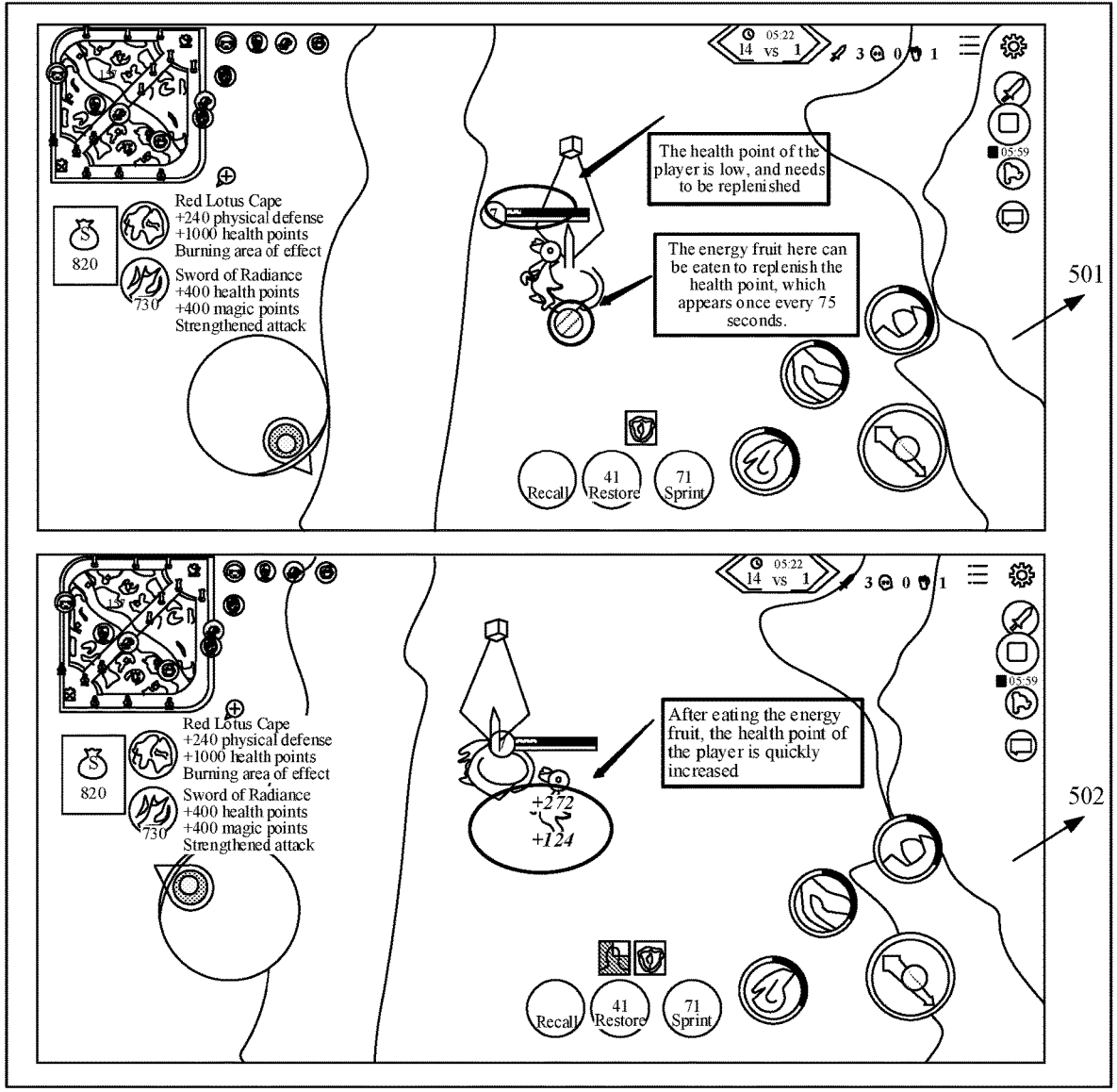
FIG. 6 is a schematic diagram of a use environment of a video encoding method according to an embodiment of this disclosure.

FIG. 6 is a schematic diagram of a use environment of a video encoding method according to an embodiment of this disclosure. In a case that the frame queue buffered in a buffer pool of a player is more than 1 frame for a long time, it means that real-time decoding computing power of the video playback terminal is relatively low, and therefore cannot adapt to a load of a current cloud game video, or it means that the decoding computing power of the video playback terminal is unstable, and therefore cannot adapt to playback of the current game video in a cloud game. In this case, as shown in FIG. 6, since the real-time decoding computing power of the video playback terminal is relatively low or unstable, compared with FIG. 5, a game user of the cloud game can only obtain the video frame 501 of number 1 and the video frame 502 of number 2 of the game video, which causes frame freezing of the game video. In this case, dynamic adjustment of the frame rate may be triggered, to prevent the playback of the cloud game video from being affected due to frame freezing of the game video.

In step 404, the video encoding apparatus dynamically adjusts a video playback encoding policy based on at least one of the network bandwidth information, the decoding computing power information, or the capacity configuration information of the playback buffer pool, to obtain a video encoding policy matching a playback environment of a target video. In an example, at least one encoding parameter of a video of the cloud game is dynamically adjusted based on (i) the network bandwidth information and (ii) the decoding computing power information, the network bandwidth information and the decoding computing power information indicating a playback environment of the video of the cloud game.

In some embodiments, the video playback encoding policy is dynamically adjusted based on at least one of the network bandwidth information, the decoding computing power information, or the capacity configuration information of the playback buffer pool, to obtain the video encoding policy matching the playback environment of the target video, and this may be implemented in the following manner: determining, in a case that a resolution of the video playback terminal is lower than a first resolution and the network bandwidth information indicates that the network bandwidth environment of the video playback terminal is unstable, that the video encoding policy matching the playback environment of the target video is a policy in which encoding is performed through frame rate reduction; and determining, in a case that the resolution of the video playback terminal is higher than or equal to the first resolution and the network bandwidth information indicates that the network bandwidth environment of the video playback terminal is unstable, that the video encoding policy matching the playback environment of the target video is a policy in which encoding is performed through video bit rate reduction.

Figure 7A:
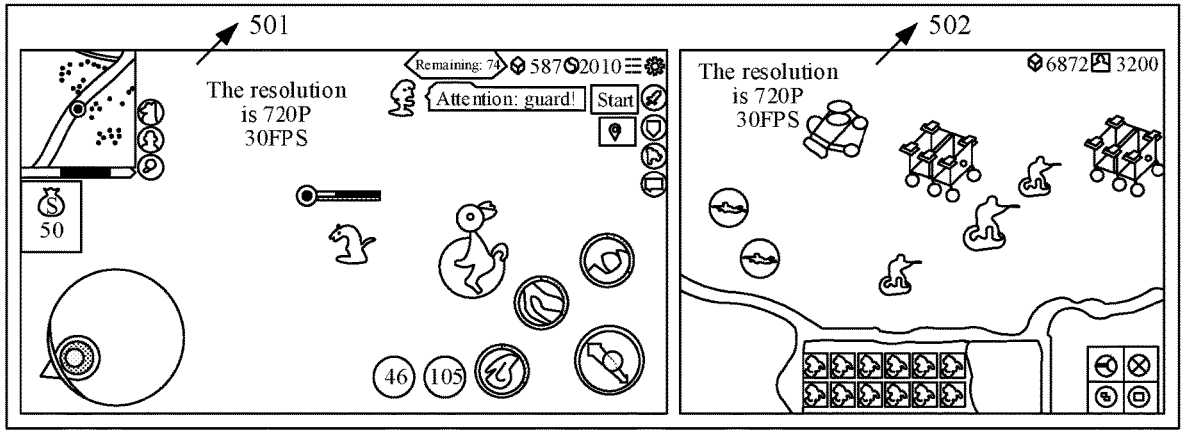
FIG. 7A is a schematic diagram of a use environment of a video encoding method according to an embodiment of this disclosure.

For example, descriptions are made by still using the cloud game as an example. FIG. 7A is a schematic diagram of a use environment of a video encoding method according to an embodiment of this disclosure. An example in which the first resolution is 720P (a row pixel) is used. In a case that a resolution selected by a user in a cloud game process is less than 720P, a network of the user terminal is switched from a broadband access cloud game server to a mobile network access cloud game server, which causes a fluctuation of an information transmission speed and instability of the bandwidth. By dynamically adjusting the video playback encoding policy, encoding is performed through the frame rate reduction (e.g., through a frame reduction processing policy, a corresponding frame rate reduction policy is selected in a case that frames per second is more than or equal to 30). In this case, as shown in FIG. 7A, the game user of the cloud game can obtain the video frame 501 of number 1 and the video frame 502 of number 2 of the game video, so that in a case that the resolution is less than 720P, a defect that only the game video frame of number 1 can be displayed due to an encoding policy with large quantity of frames per second is avoided, and a frequency of user experience degradation caused by frame dropping and frame freezing is reduced.

Figure 7B:
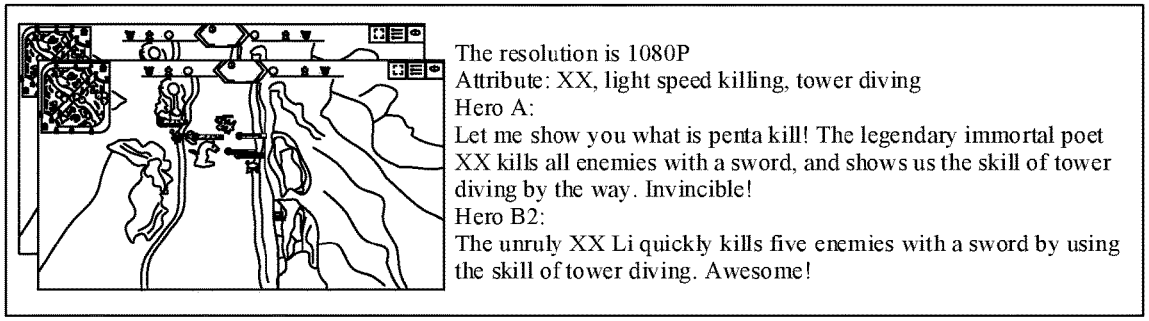
FIG. 7B is a schematic diagram of a use environment of a video encoding method according to an embodiment of this disclosure.

FIG. 7B is a schematic diagram of a use environment of a video encoding method according to an embodiment of this disclosure. An example in which the first resolution is 720P is used. In a case that the resolution selected by the user in the cloud game process is greater than or equal to 720P, the network of the user terminal is switched from the broadband access cloud game server to the mobile network access cloud game server, which causes the fluctuation of the information transmission speed and the instability of the bandwidth. By dynamically adjusting the video playback encoding policy, a quantity of data bits (e.g., the bit rate) transferred per unit time during data transmission can be reduced, to ensure that the user obtains a game video with a relatively high resolution for viewing. Since the configuration information of the video playback terminals is different, for a terminal with relatively high-standard hardware configuration, the first resolution of 720P may be improved to the second resolution of 1080P, and the quantity of data bits transferred per unit time during data transmission at a low speed is maintained, so that the video playback terminal can run the cloud game normally, thereby providing the user with better visual experience.

For example, in a case that the frame freezing still occurs after the bit rate is adjusted to be relatively low, dynamic adjustment may be performed to reduce the frame rate. For example, playback smoothness of the target video is detected in a case that the video encoding policy matching the playback environment of the target video is determined to be the policy in which encoding is performed through video bit rate reduction; and the video encoding policy matching the playback environment of the target video is determined to be the policy in which encoding is performed through frame rate reduction and video bit rate reduction in a case that the playback smoothness of the target video is detected to be less than a smoothness threshold (e.g., the frame freezing occurs during playback).

In some embodiments, in a case that the playback smoothness of the target video needs to be detected, a first image frame and a second image frame in the target video may be obtained, the first image frame and the second image frame being image frames corresponding to a display screen during playback of the target video; a difference image corresponding to the first image frame and the second image frame is obtained; the difference image is converted into a matching grayscale image, and a plurality of pixels included in the grayscale image is determined; and the playback smoothness of the target video is detected according to grayscale values of the plurality of pixels in the grayscale image.

It should be noted that a difference between the first image frame and the second image frame is positively correlated with the grayscale values in the grayscale image. That is, the larger the grayscale values in the grayscale image are, the greater the difference between the first image frame and the second image frame is. In this case, it can be determined that there is no frame freezing between the first image frame and the second image frame. Similarly, the smaller the grayscale values in the grayscale image are, the smaller the difference between the first image frame and the second image frame is. In a case that a largest grayscale value in the grayscale image is less than a preset threshold, it is determined that the frame freezing occurs between the first image frame and the second image frame.

It should be noted that, in a case that the game video in the cloud game is processed through the video encoding method provided in the embodiments of this disclosure, since computing is performed by the cloud server in the running process of the cloud game, and the video stream obtained after the computing is transmitted to the video playback terminal for playback, that is, the video playback terminal is configured to play a video in the running process of the cloud game, a requirement for the computing power of the video playback terminal in the running process of the cloud game is not very high, and the frame freezing is not likely to occur in a playback process of the game video. However, a computing amount of the cloud server is relatively large in the running process of the game, and therefore the frame freezing is likely to occur. In this case, the video stream generated by the cloud server is a video stream with frame freezing, and frame freezing caused by the video playback terminal does not exist in a process of playing the video stream by the video playback terminal. That is, a frame freezing condition in the running process of the cloud game cannot be accurately detected through the foregoing FPS. In this embodiment of this disclosure, the image frames are collected from the video in the running process of the cloud game, and whether frame freezing occurs in the running process of the cloud game is detected according to a difference degree between the image frames, thereby improving accuracy of frame freezing detection.

In some embodiments, the video playback encoding policy is dynamically adjusted based on at least one of the network bandwidth information, the decoding computing power information, or the capacity configuration information of the playback buffer pool, to obtain the video encoding policy matching the playback environment of the target video, and this may be implemented in the following manner: determining a decoding computing power/time/delay parameter of the video playback terminal based on the decoding computing power information; determining a matching target frame rate based on the decoding computing power/time/delay parameter and a threshold of frames per second; and determining the video encoding policy matching the playback environment of the target video based on the target frame rate.

In a case that the frame rate is dynamically adjusted, a largest value is selected from a constant value 30 and a dynamic value 1000/decode delay for use. By setting a minimum FPS of 30, the lowest interaction experience of the game may be ensured. In addition, notification information is presented to the game user, to suggest the game user changing the terminal to obtain better user experience.

For example, since the video frame rate is dynamically adjusted, a bit rate of audio of the cloud game accounts for a relatively small proportion of a total ratio, the decoding computing power required for decoding the audio is relatively low, and the audio in the cloud game only includes background music and voice communication sound of the user, during running of the cloud game, sound and a picture may be asynchronous and rendered separately in a case that the game audio and video are rendered, to prevent a problem of frame freezing of audio and picture synchronization processing caused by video frame rate adaptation.

In step 405, the video encoding apparatus encodes the target video through the determined video encoding policy. In an example, the video of the cloud game is encoded based on the at least one encoding parameter.

It should be noted that after the target video is encoded, the encoded target video is sent to the video playback terminal. The video playback terminal performs video decoding through the video decoding method provided in the embodiments of this disclosure, that is, the encoded target video is decoded through the video decoding policy corresponding to the video encoding policy, to play the target video on the video playback terminal.

For example, in a case that the video encoding policy is the policy in which encoding is performed through frame rate reduction, the video decoding policy is a policy in which decoding is performed through frame rate reduction. In a case that the video encoding policy is the policy in which encoding is performed through video bit rate reduction, the video decoding policy is a policy in which decoding is performed through video bit rate reduction. In a case that the video encoding policy is the policy in which encoding is performed frame rate reduction and video bit rate reduction, the video decoding policy is a policy in which decoding is performed through frame rate reduction and video bit rate reduction.

The embodiments of this disclosure may be implemented with reference to the cloud technology and the blockchain network technology. The cloud technology includes a hosting technology that unifies a series of resources such as hardware, software, and networks in a wide area network or a local area network to implement computing, storage, processing, and sharing of data, or may be understood as a collective name of a network technology, an information technology, an integration technology, a management platform technology, an application technology, and the like based on an application of a cloud computing business mode. A background service of a technical network system requires a large amount of computing and storage resources, such as a video website, an image web site, and more portal web sites. Therefore, the cloud technology needs to be supported by the cloud computing.

It should be noted that, cloud computing includes a computing mode, in which computing tasks are distributed on a resource pool formed by a large quantity of computers, so that various application systems can obtain computing power, storage space, and information services according to requirements. A network that provides resources may be referred to as a "cloud". For a user, resources in a "cloud" may seem to be infinitely expandable, and can be obtained readily, used on demand, expanded readily, and paid by use. As a basic capability provider of the cloud computing, a platform for a cloud computing resource pool is established, which is briefly referred to as a cloud platform, and generally referred to as infrastructure as a service (IaaS). A plurality of types of virtual resources are deployed in the resource pool for selection and use by an external customer. The cloud computing resource pool mainly includes a computing device (which may be a virtualization machine and includes an operating system), a storage device, and a network device.

In some embodiments, identification information of a target user may be determined in a case that the cloud game is run through a cloud server cluster; a data source cluster matching the identification information is determined according to a cloud server network; and history information of a user matching the target user is stored onto a cloud game server based on the data source cluster. Therefore, game data corresponding the game user can be updated in time. In addition, in a case that the same user plays video information in the cloud server through video playback terminals with different configurations or logs in to cloud game accounts of the same user, the cloud server can adjust the video encoding policy in time by using the decoding computing power information of the video playback terminal and the video encoding policy that are stored in the blockchain network, and adapt a corresponding video encoding policy for the video playback terminal currently used by the game user, to reduce manual adjustment and operations of the user, thereby improving the user experience.

Figure 8:
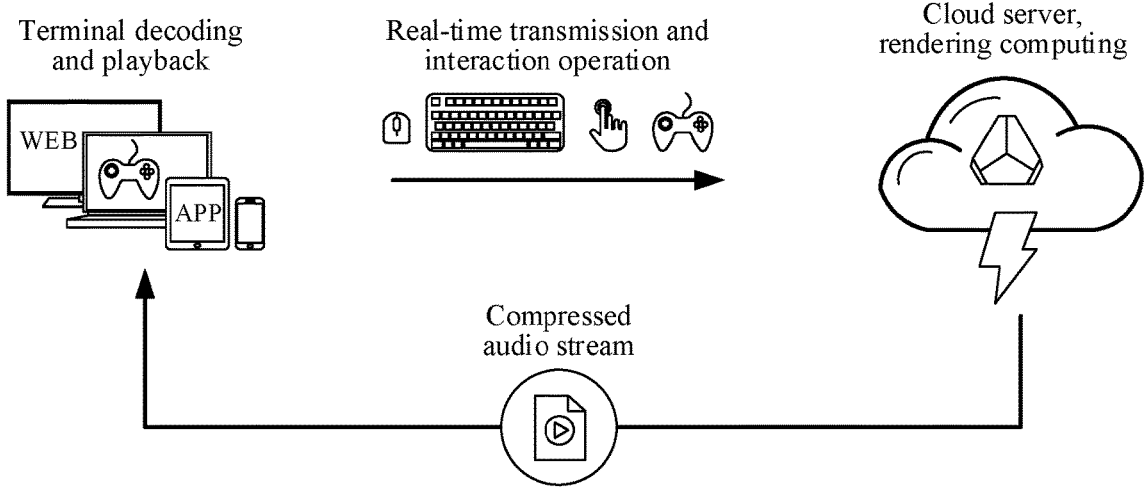
FIG. 8 is a schematic diagram of a use environment of a video encoding method according to an embodiment of this disclosure.

The video encoding method in an embodiment of this disclosure is described below by taking game video encoding processing during running of a cloud game as an example. FIG. 8 is a schematic diagram of a use environment of the video encoding method according to this embodiment of this disclosure. During running of the cloud server, a game application program performs collection and encoding on running of the game application program. A collection process includes obtaining a desktop image frame (e.g., a game image frame) from a buffer of a digital differential analyzer (DDA) and structural body information of the desktop image frame. The structural body information includes a rendering moment of the desktop image frame, that is, a refresh moment of the desktop image frame, and the refresh moment is used as a display timestamp of the desktop image frame. After the desktop image frame is encoded, an encoded file is generated, and then the encoded file is sent to the terminal for decoding and playback. The foregoing game may be implemented as follows: a first person shooting game (FPS), a multiplayer online battle arena (MOBA) game, a multiplayer gunfight survival game, and a battle royale shooting game.

Figure 9:
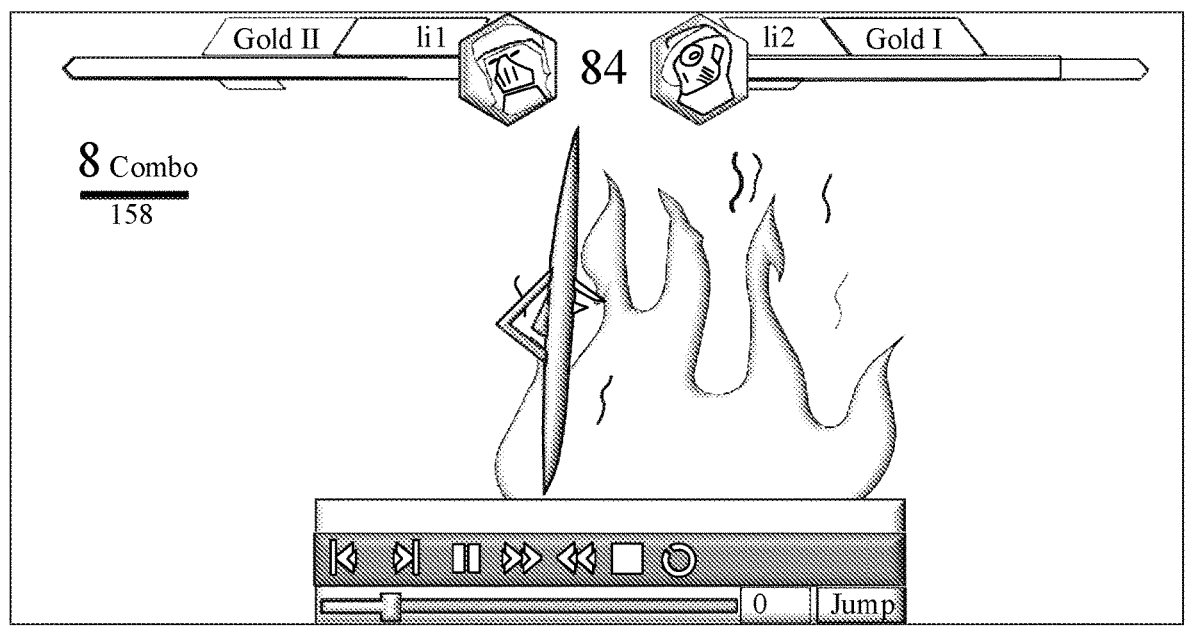
FIG. 9 is a schematic diagram of front-end display of a video encoding method according to an embodiment of this disclosure.

FIG. 9 is a schematic diagram of front-end display of a video encoding method according to an embodiment of this disclosure. Running logic of the cloud application program is pre-stored in the server. After receiving a control instruction sent by the terminal, the server controls, according to the control instruction and the pre-stored running logic, the cloud application program to run on the server, and generates a running picture (e.g., an image frame). For example, the graphics processing unit (GPU) renders the running picture and displays the running picture on a desktop. For example, the server may display the running picture through a display, or the server only generates and encodes the running picture, to obtain the encoded file, thereby sending the encoded file to the terminal to display the running picture. Since the terminal with limited decoding computing power has an insufficient hardware decoding capability when running the cloud game, a load of the terminal is relatively high, and the decoding capability cannot match a frame rate picture of the cloud server, resulting in the frame freezing shown in FIG. 9.

Figure 10:
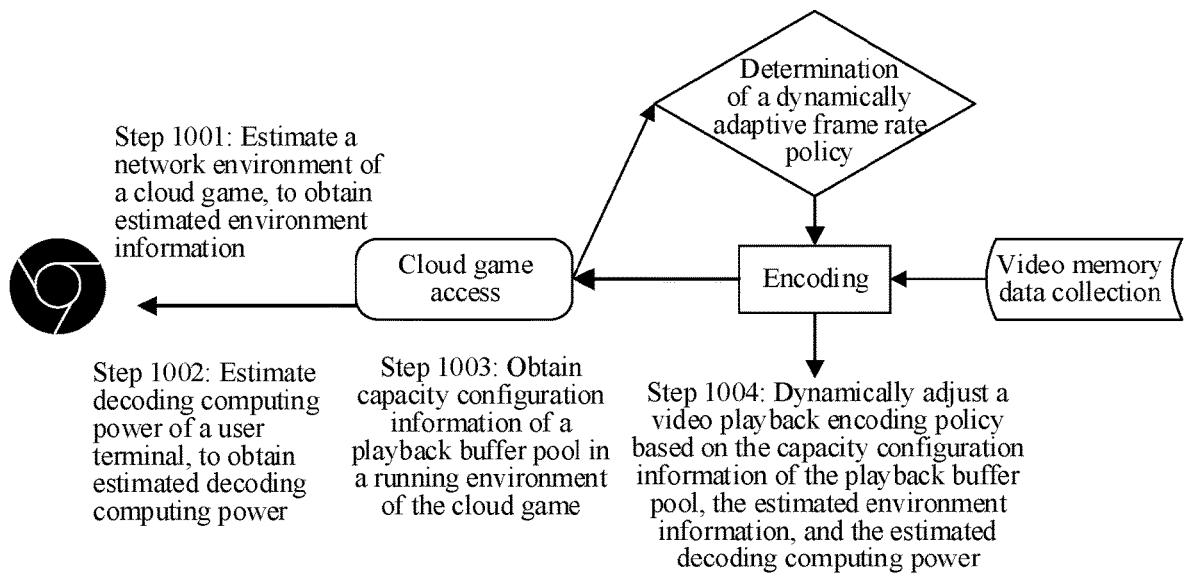
FIG. 10 is a schematic flowchart of a video encoding method according to an embodiment of this disclosure.

To overcome the foregoing problems, reference is made to FIG. 10, which is a schematic flowchart of a video encoding method according to an embodiment of this disclosure. A processing process of the video encoding method provided in this embodiment of this disclosure includes the following steps.

In step 1001, a network environment of a cloud game is estimated, to obtain estimated environment information.

In step 1002, decoding computing power of a user terminal is estimated, to obtain estimated decoding computing power.

In step 1003, capacity configuration information of a playback buffer pool in a running environment of the cloud game is obtained.

In step 1004, a video playback encoding policy is dynamically adjusted based on at least one of the capacity configuration information of the playback buffer pool, the estimated environment information, or the estimated decoding computing power. For example, in a case that a resolution in a cloud game process is less than 720P, a frame rate is reduced to 30 FPS, and in a case that the resolution in the cloud game process is greater than or equal to 720P, a video bit rate is reduced.

Figure 11:
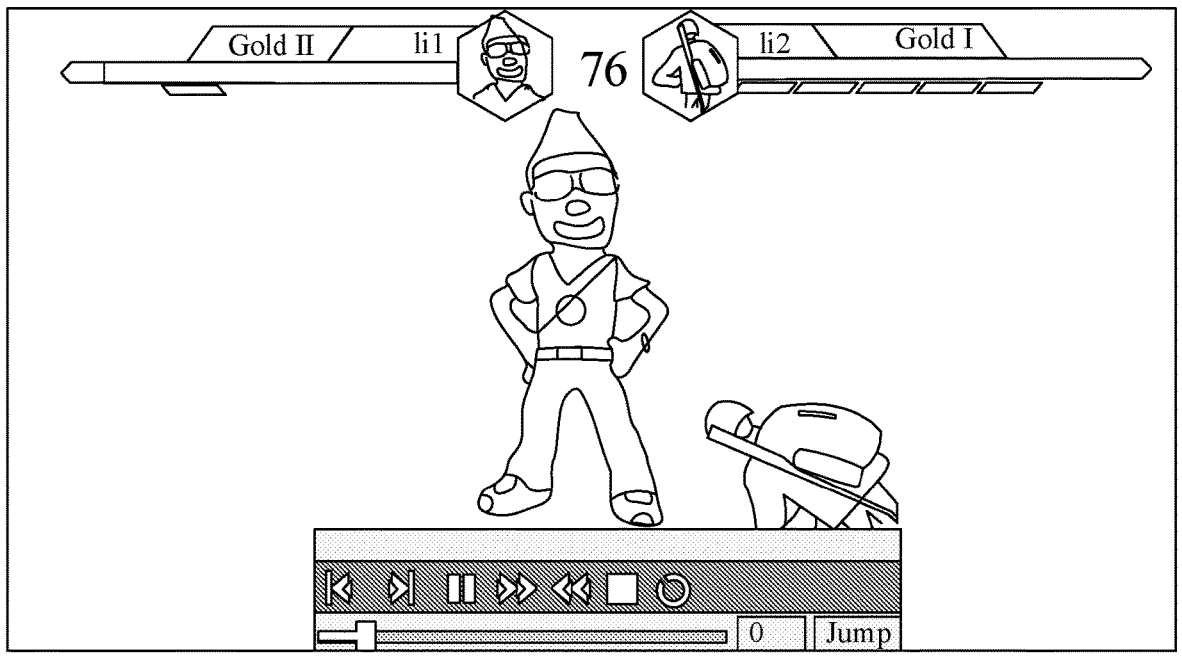
FIG. 11 is a schematic diagram of front-end display of a video encoding method according to an embodiment of this disclosure.

FIG. 11 is a schematic diagram of front-end display of a video encoding method according to an embodiment of this disclosure. Through the video encoding processing shown in FIG. 10, the minimum FPS of 30 ensures the lowest interaction experience of the game. In addition, a clear game video image frame is presented to the user, and the notification information is presented to the cloud game user, to suggest the user changing the terminal to obtain better user experience.

The following continues to describe an exemplary structure of a video encoding apparatus that is implemented as software modules according to an embodiment of this disclosure. In some embodiments, as shown in FIG. 2, the software modules in the video encoding apparatus stored in the memory 202 may include: an information processing module 2081 and an information encoding module 2082. One or more modules, submodules, and/or units of the apparatus can be implemented by processing circuitry, software, or a combination thereof, for example.

In some embodiments, the information processing module 2081 is further configured to: obtain the hardware type information of the video playback terminal; determine the configuration information of the video playback terminal based on the hardware type information of the video playback terminal; and determine the decoding computing power information of the video playback terminal based on the configuration information of the video playback terminal.

In some embodiments, the information processing module 2081 is further configured to: detect the real-time load information of the video playback terminal; and determine the decoding computing power information of the video playback terminal based on the real-time load information of the video playback terminal.

In some embodiments, the information processing module 2081 is further configured to: obtain the length of the real-time data frame queue of the playback buffer pool in the video playback environment; and determine the capacity configuration information of the playback buffer pool in the video playback environment based on the comparison result of the length of the real-time data frame queue of the playback buffer pool to the length threshold.

In some embodiments, the information processing module 2081 is further configured to: determine, in a case that the resolution of the video playback terminal is lower than the first resolution and the network bandwidth information indicates that the network bandwidth environment of the video playback terminal is unstable, that the video encoding policy matching the playback environment of the target video is the policy in which encoding is performed through the frame rate reduction; and determine, in a case that the resolution of the video playback terminal is higher than or equal to the first resolution and the network bandwidth information indicates that the network bandwidth environment of the video playback terminal is unstable, that the video encoding policy matching the playback environment of the target video is the policy in which encoding is performed through video bit rate reduction.

In some embodiments, the information processing module 2081 is further configured to: detect the playback smoothness of the target video in a case that the video encoding policy matching the playback environment of the target video is determined to be the policy in which encoding is performed through video bit rate reduction, and determine, in a case that the playback smoothness of the target video is detected to be less than the smoothness threshold, that the video encoding policy matching the playback environment of the target video is the policy in which encoding is performed through frame rate reduction and video bit rate reduction.

In some embodiments, the information processing module 2081 is further configured to: obtain the first image frame and the second image frame in the target video in a case that the video encoding policy matching the playback environment of the target video is determined to be the policy in which encoding is performed through video bit rate reduction, the first image frame and the second image frame being image frames corresponding to a display screen during playback of the target video; obtain the difference image corresponding to the first image frame and the second image frame; convert the difference image into a matching grayscale image, and determine a plurality of pixels comprised in the grayscale image; and detect the playback smoothness of the target video based on grayscale values of the plurality of pixels in the grayscale image.

In some embodiments, the information processing module 2081 is further configured to: determine a decoding computing power decoding/time/delay parameter of the video playback terminal based on the decoding computing power information; determine a matching target frame rate based on the decoding computing power/time/delay parameter and a threshold of frames per second; and determine the video encoding policy matching the playback environment of the target video based on the target frame rate.

In some embodiments, the software modules stored in a service data processing apparatus of the memory 202 may include a first processing module, configured to: determine identification information of a target object in a case that the target video is a cloud game video; determine a data source cluster matching the identification information based on a cloud server network; and store cloud game history information matching the target object onto a cloud game server based on the data source cluster.

In some embodiments, the software modules stored in the service data processing apparatus of the memory 202 may include a second processing module, configured to store the identification information of the video playback terminal, the decoding computing power information of the video playback terminal, and the video encoding policy into a content storage network, the content storage network being a block chain network or a network including at least one cloud server.

The following continues to describe an exemplary structure of a video decoding apparatus that is implemented as software modules according to an embodiment of this disclosure. The software modules in the video decoding apparatus stored in the memory may include: an obtaining module and an information decoding module. One or more modules, submodules, and/or units of the apparatus can be implemented by processing circuitry, software, or a combination thereof, for example.

The obtaining module is configured to obtain the encoded target video.

The information decoding module is configured to decode the encoded target video through a video decoding policy corresponding to a video encoding policy.

In the embodiments of this disclosure, the network bandwidth information is determined based on the network bandwidth environment of the video playback terminal; the decoding computing power information of the video playback terminal is determined; the capacity configuration information of the playback buffer pool in the video playback environment is obtained; the video playback encoding policy is dynamically adjusted based on at least one of the network bandwidth information, the decoding computing power information, or the capacity configuration information of the playback buffer pool, to determine the video encoding policy matching the playback environment of the target video; and the target video is encoded through the determined video encoding policy. In this case, the network bandwidth information, the decoding computing power information, and the capacity configuration information of the playback buffer pool can be used to dynamically adjust the video playback encoding policy, determine the video encoding policy matching the playback environment of the target video, and reduce the cases of frame freezing during video playback caused by the change of the network environment and the insufficient decoding capability of the terminal, thereby improving the user experience.

The foregoing descriptions are merely embodiments of this disclosure and are not intended to limit the scope of this disclosure. Any modification, equivalent replacement, or improvement made within the spirit and principle of this disclosure shall fall within the scope of this disclosure.

What is claimed is:

1. A video encoding method of a cloud game, comprising:
   determining network bandwidth information of a video playback terminal;
   receiving terminal status information from the video playback terminal, the terminal status information including at least one of processing load information or buffer information of the video playback terminal;
   determining decoding computing power information of the video playback terminal based on the at least one of the processing load information or the buffer information included in the received terminal status information;
   dynamically adjusting at least one encoding parameter of a video of the cloud game based on (i) the network bandwidth information and (ii) the decoding computing power information, the network bandwidth information and the decoding computing power information indicating a playback environment of the video of the cloud game; and
   encoding the video of the cloud game based on the at least one encoding parameter.

2. The method according to claim 1, wherein the terminal status information includes the buffer information of a playback buffer of the video of the cloud game in the video playback terminal.

3. The method according to claim 1, wherein the determining the decoding computing power information comprises:
   obtaining hardware type information of the video playback terminal;
   determining configuration information of the video playback terminal based on the hardware type information of the video playback terminal; and
   determining the decoding computing power information of the video playback terminal based on the configuration information of the video playback terminal and the at least one of the processing load information or the buffer information.

4. The method according to claim 1, wherein the terminal status information includes the processing load information, the processing load information including real-time processing load information of the video playback terminal.

5. The method according to claim 2, wherein the buffer information of the playback buffer is based on a comparison of a length of a real-time data frame queue of the playback buffer to a length threshold.

6. The method according to claim 1, wherein the dynamically adjusting comprises:
   determining, based on a resolution of the video playback terminal being lower than a first resolution and the network bandwidth information indicating that network bandwidth of the video playback terminal is less than a stability threshold, that the dynamic adjustment of the at least one encoding parameter includes frame rate reduction; and
   determining, based on the resolution of the video playback terminal being higher than or equal to the first resolution and the network bandwidth information indicating that the network bandwidth of the video playback terminal is less than the stability threshold, that the dynamic adjustment of the at least one encoding parameter includes video bit rate reduction.

7. The method according to claim 6, further comprising:
   detecting playback smoothness of the video of the cloud game based on the dynamic adjustment of the at least one encoding parameter including the video bit rate reduction; and
   determining, based on the playback smoothness of the video of the cloud game being detected to be less than a smoothness threshold, that the dynamic adjustment of the at least one encoding parameter includes the frame rate reduction and the video bit rate reduction.

8. The method according to claim 7, wherein the detecting the playback smoothness of the video comprises:
   obtaining a first image frame and a second image frame in the video of the cloud game based on the dynamic adjustment of the at least one encoding parameter including the video bit rate reduction, the first image frame and the second image frame being displayed during playback of the video of the cloud game;
   obtaining a difference image corresponding to the first image frame and the second image frame;
   converting the difference image into a matching grayscale image, and determining a plurality of pixels included in the grayscale image; and
   detecting the playback smoothness of the video of the cloud game based on grayscale values of the plurality of pixels in the grayscale image.

9. The method according to claim 1, wherein the dynamically adjusting comprises:
   determining at least one of a decoding computing power parameter, decoding computing time parameter, or decoding computing delay parameter of the video playback terminal based on the decoding computing power information;
   determining a matching target frame rate based on the at least one of the decoding computing power parameter, the decoding computing time parameter, or the decoding computing delay parameter and a threshold of frames per second; and
   dynamically adjusting the at least one encoding parameter based on the target frame rate.

10. The method according to claim 1, further comprising:
    determining identification information of a target object;
    determining a data source cluster matching the identification information based on a cloud server network; and
    storing cloud game history information matching the target object onto a cloud game server based on the data source cluster.

11. The method according to claim 10, further comprising:
    storing the identification information of the video playback terminal, the decoding computing power information of the video playback terminal, and encoding information associated with the dynamic adjustment of the at least one encoding parameter into a content storage network, the content storage network being a blockchain network or a network comprising at least one cloud server.

12. A video encoding apparatus, comprising:
processing circuitry configured to:
determine network bandwidth information of a video playback terminal;
receive terminal status information from the video playback terminal, the terminal status information including at least one of processing load information or buffer information of the video playback terminal;
determine decoding computing power information of the video playback terminal based on the at least one of the processing load information or the buffer information included in the received terminal status information;
dynamically adjust at least one encoding parameter of a video of a cloud game based on (i) the network bandwidth information and (ii) the decoding computing power information, the network bandwidth information and the decoding computing power information indicating a playback environment of the video of the cloud game; and
encode the video of the cloud game based on the at least one encoding parameter.

13. The video encoding apparatus according to claim 12, wherein
the terminal status information includes the buffer information of a playback buffer of the video of the cloud game in the video playback terminal.

14. The video encoding apparatus according to claim 12, wherein the processing circuitry is configured to:
obtain hardware type information of the video playback terminal;
determine configuration information of the video playback terminal based on the hardware type information of the video playback terminal; and
determine the decoding computing power information of the video playback terminal based on the configuration information of the video playback terminal and the at least one of the processing load information or the buffer information.

15. The video encoding apparatus according to claim 12, wherein
the terminal status information includes the processing load information, the processing load information including real-time processing load information of the video playback terminal.

16. The video encoding apparatus according to claim 13, wherein
the buffer information of the playback buffer is based on a comparison of a length of a real-time data frame queue of the playback buffer to a length threshold.

17. The video encoding apparatus according to claim 12, wherein the processing circuitry is configured to:
determine, based on a resolution of the video playback terminal being lower than a first resolution and the network bandwidth information indicating that network bandwidth of the video playback terminal is less than a stability threshold, that the dynamic adjustment of the at least one encoding parameter includes frame rate reduction; and
determine, based on the resolution of the video playback terminal being higher than or equal to the first resolution and the network bandwidth information indicating that the network bandwidth of the video playback terminal is less than the stability threshold, that the dynamic adjustment of the at least one encoding parameter includes video bit rate reduction.

18. The video encoding apparatus according to claim 17, wherein the processing circuitry is configured to:
detect playback smoothness of the video based on the dynamic adjustment of the at least one encoding parameter including the video bit rate reduction; and
determine, based on the playback smoothness of the video being detected to be less than a smoothness threshold, that the dynamic adjustment of the at least one encoding parameter includes the frame rate reduction and the video bit rate reduction.

19. The video encoding apparatus according to claim 18, wherein the processing circuitry is configured to:
obtain a first image frame and a second image frame in the video of the cloud game based on the dynamic adjustment of the at least one encoding parameter including the video bit rate reduction, the first image frame and the second image frame being displayed during playback of the video;
obtain a difference image corresponding to the first image frame and the second image frame;
convert the difference image into a matching grayscale image, and determining a plurality of pixels included in the grayscale image; and
detect the playback smoothness of the video of the cloud game based on grayscale values of the plurality of pixels in the grayscale image.

20. A non-transitory computer-readable storage medium, storing instructions which when executed by a processor cause the processor to perform:
determining network bandwidth information of a video playback terminal;
receiving terminal status information from the video playback terminal, the terminal status information including at least one of processing load information or buffer information of the video playback terminal;
determining decoding computing power information of the video playback terminal based on the at least one of the processing load information or the buffer information included in the received terminal status information;
dynamically adjusting at least one encoding parameter of a video of a cloud game based on (i) the network bandwidth information and (ii) the decoding computing power information, the network bandwidth information and the decoding computing power information indicating a playback environment of the video of the cloud game; and
encoding the video of the cloud game based on the at least one encoding parameter.

* * * * *